(12) United States Patent
Olsson et al.

(10) Patent No.: US 8,908,603 B2
(45) Date of Patent: Dec. 9, 2014

(54) MME RESTORATION

(75) Inventors: Lars-Bertil Olsson, Angered (SE); Hans-Olof Sundell, Kalvsund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 252 days.

(21) Appl. No.: 13/486,303

(22) Filed: Jun. 1, 2012

(65) Prior Publication Data
US 2013/0188555 A1 Jul. 25, 2013

Related U.S. Application Data (63) Continuation of application No. PCT/EP2012/060080, filed on May 30, 2012.

(60) Provisional application No. 61/589,883, filed on Jan. 24, 2012.

(51) Int. Cl.
*H04W 4/00* (2009.01)
*H04L 1/00* (2006.01)

(52) U.S. Cl.
USPC .......................................... 370/328; 370/221

(58) Field of Classification Search
None
See application file for complete search history.

(56) References Cited

U.S. PATENT DOCUMENTS

| | | | |
|---|---|---|---|
| 2010/0220656 A1* | 9/2010 | Ramankutty et al. | 370/328 |
| 2011/0205900 A1* | 8/2011 | Zhang | 370/237 |
| 2011/0235505 A1* | 9/2011 | Eswara et al. | 370/221 |
| 2012/0023360 A1* | 1/2012 | Chang et al. | 714/4.11 |
| 2013/0100813 A1* | 4/2013 | Velamati et al. | 370/236 |
| 2013/0189951 A1* | 7/2013 | Lopez et al. | 455/411 |

FOREIGN PATENT DOCUMENTS

| | | |
|---|---|---|
| EP | 2317790 A1 | 5/2011 |
| KR | 20110064407 A | 6/2011 |
| WO | 2011141154 A1 | 11/2011 |

OTHER PUBLICATIONS

International Search Report and Written Opinion dated Oct. 2, 2012 from corresponding PCT application No. PCT/EP2012/060080, 11 pages.

* cited by examiner

*Primary Examiner* — Clemence Han
(74) *Attorney, Agent, or Firm* — Rothwell, Figg, Ernst & Manbeck, P.C.

(57) ABSTRACT

A method for a mobility management entity (MME) is disclosed. In some embodiments the method includes: establishing a UE context for a UE; selecting a back-up MME for holding a duplicate context of the user entity; informing a SGW of the selected back-up MME; and transmitting a the duplicate context to the selected back-up MME.

30 Claims, 10 Drawing Sheets

UE CONTEXT AND DUPLICATED DATA

FIG. 3 – UE CONTEXT AND DUPLICATED DATA

FIG. 4 – MME (MME / SGSN)

FIG. 5a – SGW (S-GW / GGSN / P-GW)

FIG. 5b – SGW (S-GW / GGSN / P-GW)

FIG. 5c – SGW (S-GW / GGSN / P-GW)

MME RESTORATION

CROSS-REFERENCE TO RELATED APPLICATIONS

This application claims the benefit of provisional patent application No. 61/589,883 filed Jan. 24, 2012; this application is also a continuation of international patent application no. PCT/EP2012/060080, filed May 30, 2012, which designates the U.S. The above mentioned references are incorporated by reference herein in their entirety.

TECHNICAL FIELD

This invention relates to the field of handling node outages or failing communication connections in a telecommunication network. More specifically, the invention concerns mobility management entity, MME, or restoration in an Evolved Packet System, EPS. The invention also is directed to Serving Gateway Support Node, SGSN, restoration in a 2G and 3G system.

BACKGROUND

Figure 1:
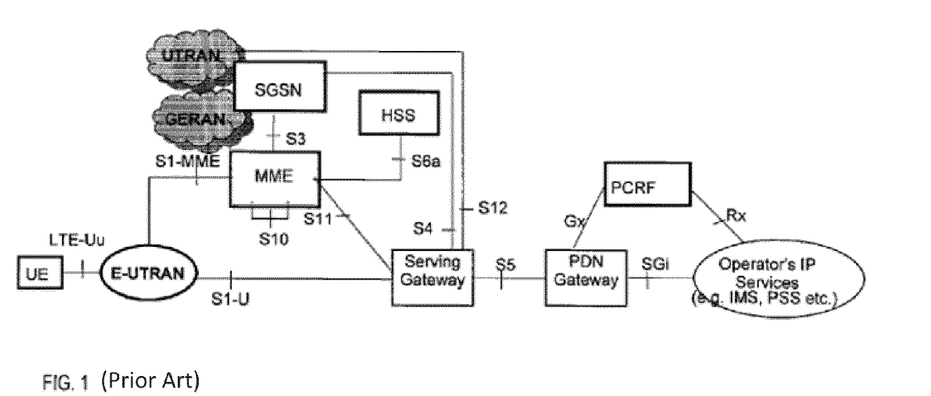
FIG. 1 shows a prior art network architecture comprising a mobility management entity, MME, and a serving gateway, SGW.

FIG. 1 shows a non-roaming 3GPP network architecture for EPS.

A User Equipment (UE) may interact with EPS using the Evolved Universal Terrestrial Radio Access Network (E-UTRAN) radio access. UE-related control signalling is handled by Mobility Management Entity (MME) with support of subscription information provided by the Home Subscriber Server (HSS). User payload is handled by the Serving Gateway (S-GW) and the PDN Gateway (P-GW). The P-GW may interact with a Policy and Charging Rules Function (PCRF).

The 3GPP network may be organized using multiple MMEs serving the same tracking areas of an LTE radio network and multiple SGSNs serving the same routing areas of a GERAN/UTRAN radio network. These architecture options are named MME Pool and SGSN Pool respectively.

Figure 2:
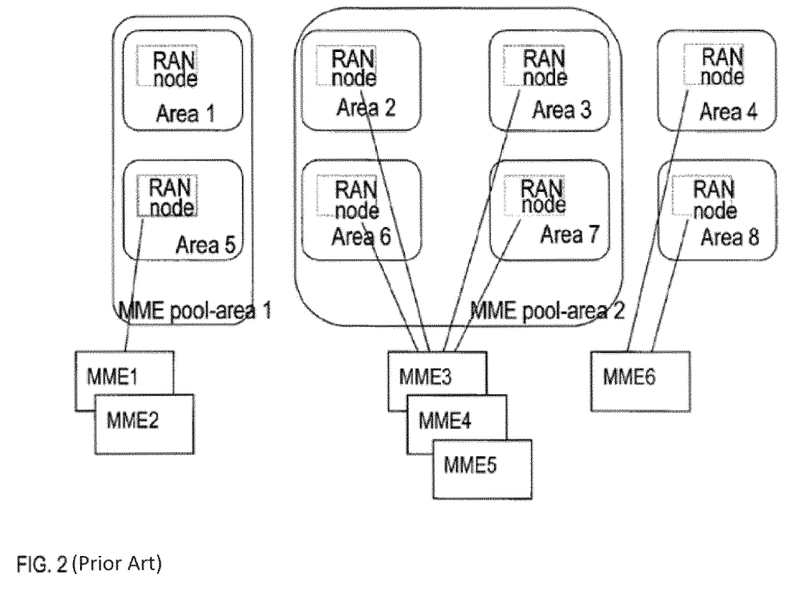
FIG. 2 shows so-called MME pools as is known in the art.

FIG. 2 shows an example of MME pool-area configuration. An SGSN pool-area configuration may be provided having a similar architecture.

Concerning legacy mechanisms at MME Restoration, the SGSN/MME shall according to present standards delete all UE contexts affected by the restart that it may have stored. For UE contexts not affected by the restart, the SGSN/MME shall update HSS at a next UE-originated event. After restart, an SGSN/MME changes the restart counter in GTP signalling with the SGW. An SGW that receives a change in the restart counter may select to remove all UE contexts related to the restarted SGSN/MME, or, select to use Network triggered service restoration procedure.

For a detected communication failure at interface S4 or S11, a SGSN/MME shall according to standards delete all PDP (Packet Data Protocol) contexts/PDN connections that are affected by the communication failure. An SGW that detects a communication error may select to remove all UE contexts related to the restarted SGSN/MME, or, select to use Network triggered service restoration procedure.

Based on 3GPP TS 23.007 section 25, the SGW may as an option support the network triggered service restoration procedure. After a restart of the SGSN/MME and when the SGW detects a change in restart counter, it removes bearers that are not allowed to be active when the UE is in idle state but does not remove the UE context. The SGW does at the same time start a timer to supervise that remaining UE contexts are not kept handled indefinitely by the node.

3GPP TS 29.274 provides a protocol specification of the Evolved GPRS Tunneling Protocol (GTP) for Control plane. Some protocol uses are application signaling between MME and S-GW at the S11 interface, and application signaling between S-GW and P-GW at the S5 and S8 interfaces.

3GPP TS 29.060 provides a protocol specification of the GPRS Tunneling Protocol (GTP) across the Gn and Gp interface.

At a received downlink packet with user plane data at S5/S8, the SGW shall immediately send a Downlink Data Notification message including IMSI to the SGSN/MME. The SGW may select to send the Downlink Data Notification including IMSI to a different SGSN/MME in a serving SGSN Pool/MME Pool.

SUMMARY OF THE INVENTION

A signalling efficient and fast restoration in case an MME is crashed or can not be reached is provided. It is a further object to arrange for back-up copies being provided and updated in nodes while securing that redundant data amount and the signalling load is kept at—if not a minimum level—then at an acceptable low level.

According to some embodiments, there is provided a method for a mobility management entity (MME) in a pool of MMEs being adapted for communicating with at least one other MME in the pool of MMEs. The MME moreover being adapted for communicating with a serving gateway (SGW). The MME manages the mobility of user entities (UEs) for establishing packet data communication between the serving gateway and UEs via at least a base station (e.g, an eNB). In some embodiments, the method includes: establishing a UE context for a user entity; appointing a back-up MME for holding a duplicate context of the user entity; informing the SGW in which MME a duplicate context is held, or is to be held; and transmitting a duplicate context to the appointed MME.

According to another aspect there is provided a method for a serving gateway node (SGW) being adapted for communicating with a mobility management entity (MME) in a pool of MMEs. An MME of at least a sub-group of the pool is adapted for storing at least a user entity context for which a corresponding user entity is registered. The MME of at least a sub-group of the pool moreover being adapted for storing at least a duplicate user entity context, for which a further corresponding user entity is not registered with the MME, but which further user entity is registered in another MME of the pool. The SGW is being adapted for storing a list of user entities, indicating for a given user entity, in which MME, the corresponding user entity context in question is registered and in which MME, a duplicate user entity context is held. In some embodiments, the method includes: continuously updating at least available MMEs and keeping a prioritized list for the available MMEs; and upon receiving a downlink packet for a UE, forwarding a message or information to a next available MME according to the prioritized list, such as an MME at which the UE is registered or an MME, in which a duplicate context is held.

According to a still further aspect of the invention there is provided an MME in a pool of MMEs. The MME includes a central processing unit, a memory, and an interface unit. The MME is adapted for communicating with at least one other MME in the pool of MMEs, and the MME is moreover adapted for communicating with a SGW. The MME is operable to manage the mobility of UEs for establishing packet data communication between the SGW and UEs via at least a base station (e.g., eNB). The MME is also adapted for storing at least a user entity context for which a corresponding user entity is registered. Moreover, the MME is adapted for storing at least a duplicate user entity context, for which a further corresponding user entity is not registered with the MME, but which further user entity is registered in the other MME of the pool.

According to a still further aspect of the invention there is provided a serving gateway node wherein an MME of at least a sub-group of the pool is adapted for storing at least a user entity context for which a corresponding user entity is registered. The MME of at least a sub-group of the pool is moreover adapted for storing at least a duplicate user entity context, for which a further corresponding user entity is not registered with the MME, but which further user entity is registered in another MME of the pool. The SGW is adapted for storing a list of user entities, indicating for a given user entity, in which MME, the corresponding user entity context in question is registered and in which MME, a duplicate user entity context is held. The SGW is also adapted for continuously updating at least available MMEs and keeping a prioritized list of available MMEs. Upon receiving a downlink packet for a UE, the SGW is configured to forward a message or information to a next available MME according to the prioritized list, such as an MME at which the UE is registered or an MME, in which a duplicate context is held.

In this manner an efficient MME restoration is enabled in the pool while only incurring a light signalling load concerning duplicate context handling.

DETAILED DESCRIPTION

Figure 3:
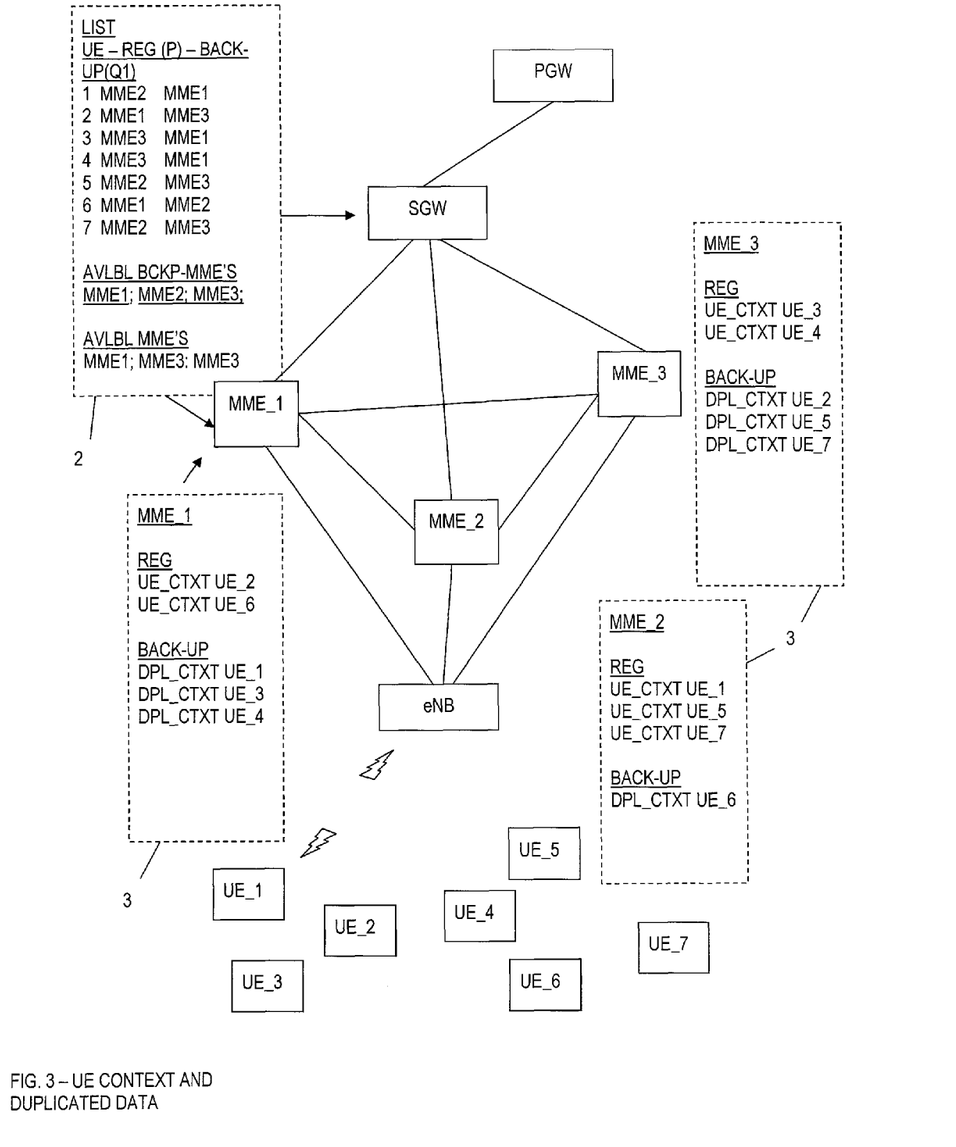
FIG. 3 shows an embodiment of the invention for storing lists of UE contexts and duplicate UE contexts in various nodes, such as MMEs, as well as lists in an SGW.

FIG. 3 shows an embodiment of the invention for storing lists of UE contexts and duplicate UE contexts in various nodes, such as in mobility management entities, MMEs, MME_1; MME_2; MME_3, and in a serving gateway node, S-GW. There is moreover provided a base station, eNB, such as an eNodeB known from 3GPP LTE and a packet gateway, PGW, e.g. a PDN (Packet Data Network) gateway, P-GW, as denoted in 3GPP LTE.

It should be noted that for the invention, the notion MME not only relates to mobility management entities as known from the 3GPP LTE standards referred to above, but also encompass Serving Gateway Support Nodes, SGSNs, known from 3GPP standards for packet switched transport in GERAN and UTRAN.

Moreover, the serving gateway node, SGW, according to the invention could relate to a 3GPP GGSN or a 3GPP LTE serving gateway node, S-GW, or a 3GPP LTE PDN gateway node, P-GW, providing the Gn/Gp interface between the P-GW and the MME.

According to an embodiment of the invention, the MME is monitoring the status of all pool members e.g. by using the Echo procedure at the S16/S10/Gn interface.

Each pool member is configured with information about with which redundant geographical area the nodes' NRI values/MME Code values belong to.

According to an aspect of the invention, SGSNs—of an SGSN Pool—and MMEs—of an MME Pool as part of normal S4 and S11 signalling—provide the SGW with information about: the currently operative nodes in the pool, where a backup or backups of a given UE context is stored, and at which node in the pool the UE is registered.

According to an embodiment of the invention, the SGW, based on the additional information, selects a node from the pool and in message or information, such as a Downlink Data Notification including IMSI, also includes information about where a backup copy of the UE context—also denoted duplicate context—has been stored, and, at which node in the pool the UE is registered.

The SGW is provided with a dynamically updated and "correct" list of all nodes in the pool that are available for interaction. Although the SGW is already aware of nodes in the pool that the SGW currently has a relation to, from interaction for UEs, this new information ensures that SGW is informed about all available nodes in the pool.

In case the MME node, in which the UE is registered, has become unavailable, the SGW may select an available node from the MME pool and may send a message or information, such as a Downlink Data Notification, including IMSI to that node. Advantageously, the SGW selects the MME where the backup copy of the UE context is located. If this MME node is not the node that SGW selects, the selected node advantageously is provided with information about where the backup copy of the UE context has been is stored.

At a local error in the transport layer of S11/S4/Gn, the receiving MME could use information about in which MME node in the pool where the UE is currently registered, provided that the transport error is not present at the inter-node communication within the pool. In this case, the selected node is able to retrieve the UE context from the MME node where the UE is registered in order to page the UE.

The Downlink Data Notification message comprises information about in which node the UE is registered. This allows the receiving MME to compare the identity of its own geographical area with the identity of the geographical area configured for the UE where the UE is registered, and use the comparison result as one input parameter at determining which node that has been used as backup node for the IMSI.

The result is that there is no need for trial-and-error signalling to each of the geographical areas at requesting to retrieve duplicated data for an IMSI since the correct node, in most cases, can be determined directly.

FIG. 3 shows one exemplary embodiment of invention for distributing UE contexts in various nodes, such as MMEs. There is shown a serving gateway node, SGW, which may be denoted S-GW in 3GPP standards, a base station, e-Node B, eNB, as well as exemplary mobility management entities MME_1, MME_2 and MME_3. An exemplary number of user entities UE_1-UE_7 is shown.

MME_1, MME_2 and MME_3 form part of a redundancy group, such as an MME pool. Registered UE contexts are stored in given MMEs and duplicate UE contexts are stored in alternative MMEs—i.e. as a back-up copy. In the following, the notion registered MME, MME_REG, will be used for a given UE context in which the UE context is registered, while back-up MME, MME_BCKP, will be used for an MME holding a duplicate UE context for a given UE.

Hence, in the individual MMEs of the pool according to the invention, there are provided lists 2 of UEs for which UE contexts are registered and for which back-up UE contexts are stored, as well as the UE contexts and duplicate contexts as such, 3.

In order to optimize signalling load and also memory, duplicate copies are populated among the MMEs in a selective manner according to the invention.

Moreover, the SGW holds a list 2 for a given MME pool, which list comprises information regarding in which particular MMEs given registered UE contexts can be found as well as in which MMEs, i.e. back-up MMEs, duplicate UE contexts can found as well as which MMEs are available. There may appear various versions or fractions of information constituted by the list 2 in the respective nodes as information is updated. Moreover, the list may comprise information about a restricted sub-group of the MME pool that is adapted to hold duplicate contexts, here denoted back-up MMEs.

The purpose of storing duplicate contexts is to secure session continuity and/or quick MME restoration in case an MME node should fail or in case one of the interfaces between SGW and MMEs should fail.

As appears from FIG. 3 for UE_1, by example, the UE context is registered with MME_2 and the duplicate UE context is stored with MME_1. Further, by example, UE_3 is registered with MME_3 and the duplicate context is stored with MME_1. UE Contexts and duplicate UE contexts for exemplary remaining UEs 2, 4-7, are also indicated in FIG. 3.

Figure 4:
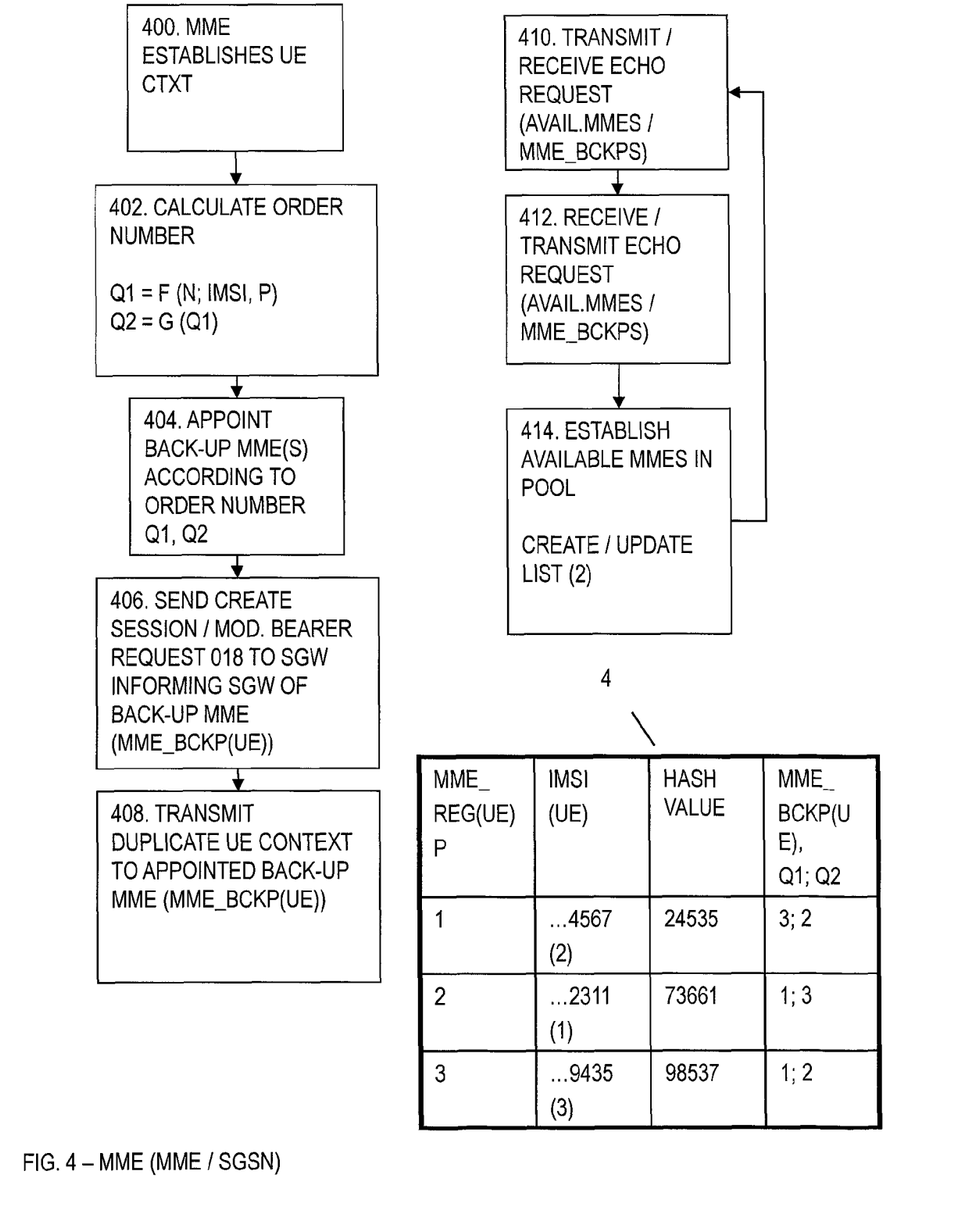
FIG. 4 shows flow diagrams for an MME pertaining to the first embodiment of the invention as well as a table for appointing back-up MMEs.
Figure 5A:
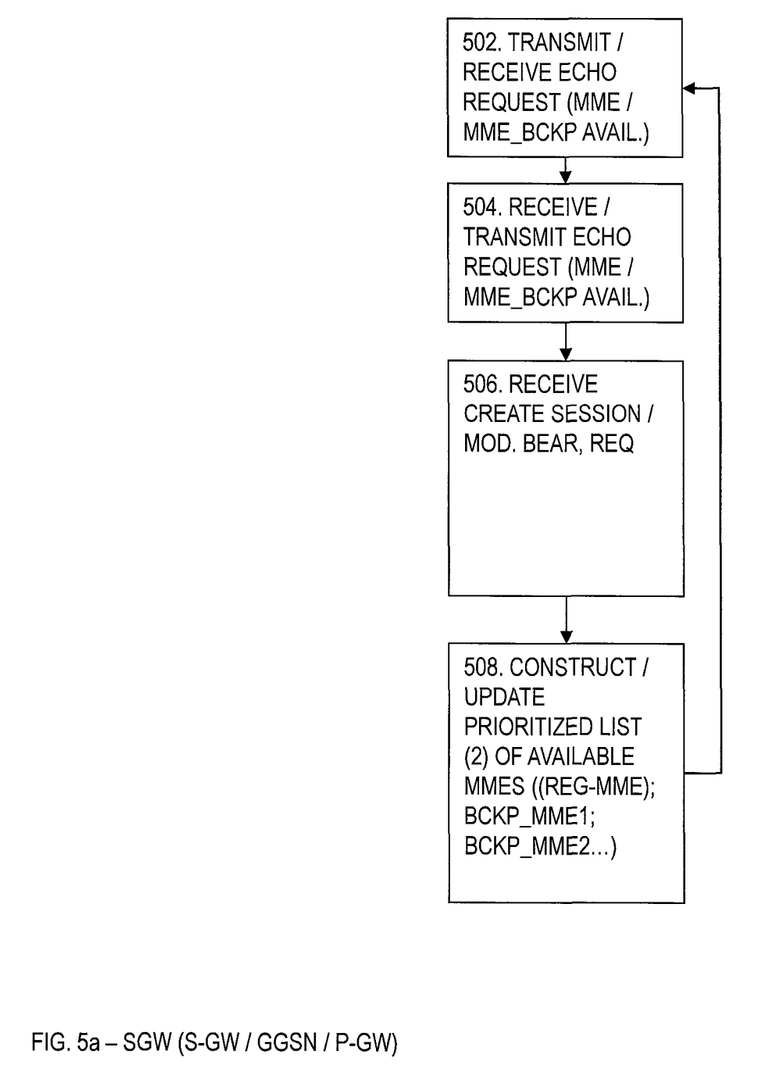
FIG. 5a shows a flow diagram for an SGW pertaining to the first and second embodiment of the invention.
Figure 5B:
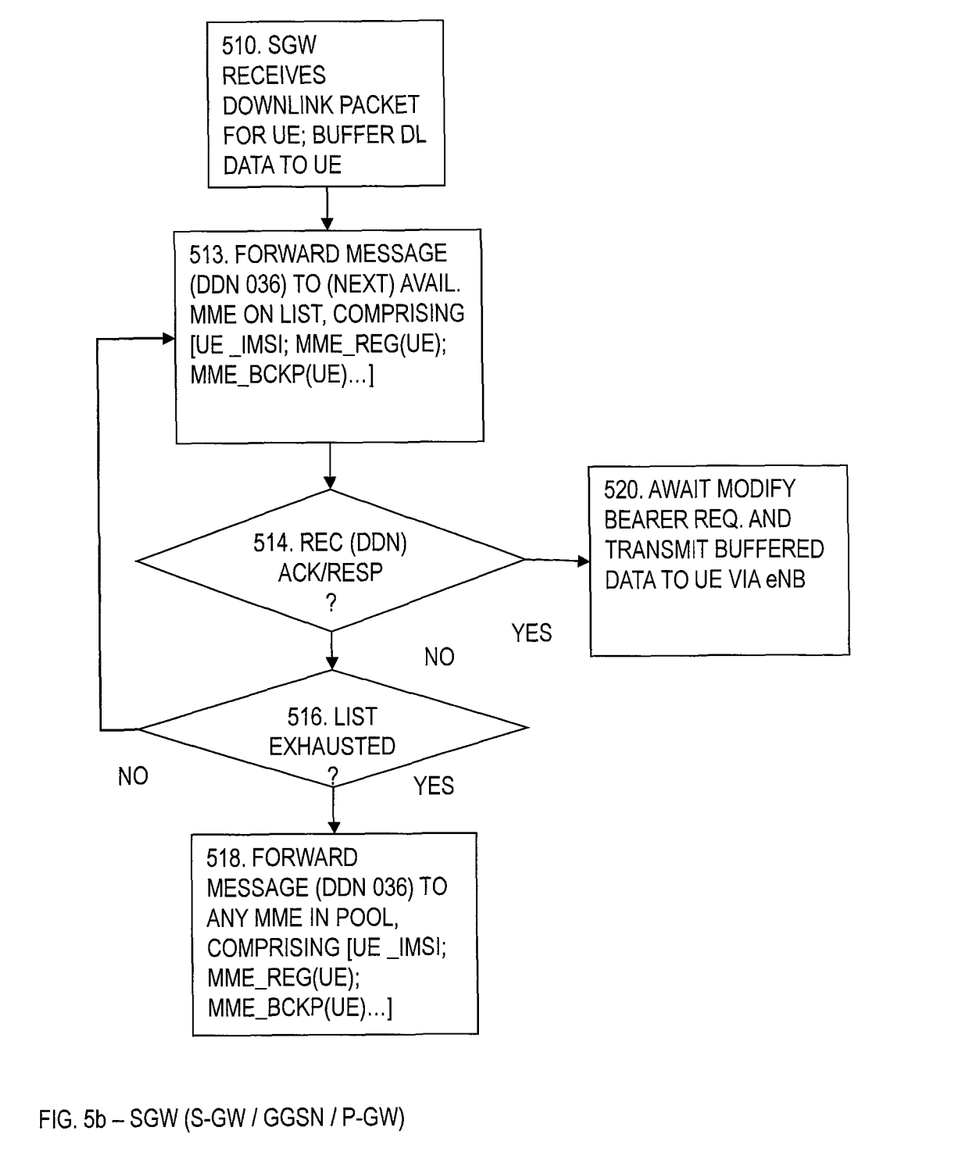
FIG. 5b shows a further flow diagram for an SGW pertaining to the first embodiment of the invention.

In FIG. 4, two branches, 400-408 and 410-414, of a first flow diagram for an MME pertaining to the first embodiment of a first method according to the invention as well as a table 4 for appointing back-up MMEs is shown. FIG. 5a and FIG. 5b show two branches, 502-508 and 510-518, of a second flow diagram for a SGW pertaining to a second method of the first embodiment according to the invention. The task of the first and the second methods is among other to populate the back-up contexts in the MMEs. The working of these methods shall be explained in the following.

The SGW and the MMEs of the pool sense and communicate the availability of the individual currently operative nodes in the pool. In steps 410, 412, concerning the MME, and steps 502, 504, concerning the SGW, the nodes transmit; respectively receive information on MME availability by making use of known echo signalling, available MMEs and back-up MMEs are communicated, so as to create/update the list 2 of FIG. 3.

Due to the exchange of information, the MME establishes step 414 information on back-up MMEs and available MMEs in the pool, corresponding to the list 2. The same applies to the SGW in step 508. Moreover, the SGW may further provide prioritization among a plurality of back-up MMEs if such are provided, such that the SGW may act and select between MMEs accordingly. Such a prioritization may also include the registered MME as a first priority, if available, and subsequent, back-up MMEs to the extent that they are available.

In some embodiments, the number N of MMEs in the pool—or back-up MMEs—is a known system parameter. From, the number N, an identification order number P corresponding to each MME/back-up MME in the pool can be derived.

In step 400, when the MME establishes a given UE context, the MME calculates in step 402 an order number Q1 and optionally a further order number Q2. Such order number indicates a respective, or respective further, back-up MME in which a duplicate UE context shall be stored.

This assignment Q1 of the back-up MME for a given UE may be based on a function F using as input parameters the IMSI of the UE, the number of operative MMEs, N, and the order number P of the MME in which the given UE context is registered.

The function F may be based on a random function which again may use the IMSI as an input variable or seed, such that a random alternative MME is chosen in order to distribute duplicate contexts evenly. Hence, the function F secures that Q1 is chosen to differ from P. A further function G may appoint a further back-up MME, given by order number Q2. Again Q2 should be different from P and also different from Q1.

The table 4 illustrates the outcome of the functions F and G forming random values on IMSI values of UEs registered in respective MME with order number P so as to appoint MMEs, with order numbers Q1 and Q2, for appointing and storing the duplicate contexts in MMEs.

According to the invention, either all pool members may be adapted to hold duplicate contexts or only a sub-group of the pool members may be adapted to hold duplicate contexts, i.e. back-up MMEs. In the latter case, an appointment should be restricted to only such back-up MMEs.

The appointment is done in step 404 in the MME. Subsequently, the SGW is informed in step 406 about the particular appointed MMEs for the UE, that is, in which MME(s) a duplicate context is/are to be stored, e.g. SGW is informed by means of a create session request/modify bearer request message, c.f. 018 FIG. 6, which information is acknowledged and transferred back to the appointed back-up MME, step 506, FIG. 5a, c.f. also 020, FIG. 6.

The subgroup of available back-up MMEs, as known to the MME issuing the information may also be comprised in this step 406.

The mapping of the IMSI to a "hash value" could be any fixed hashing algorithm. Requirements on the hashing function are that IMSI to "hash value" are approximately uniformly distributed over the range of "hash value" and/or range of "hash value" is either much larger than number of MMEs in the pool or equal to a multiple of the number of backup MMEs allowed for each MME.

This hashing algorithm from IMSI to "hash value" may be for example: md5sum(IMSI); 3GPP mapping employed for IMSI to MSC # in an MSC pool; 3GPP mapping of IMSI to paging occasion.

The second stage of "hash value" to "backup" MME should preferably be: (a) Roughly equally distributed between allowed back-up MMEs. (b) Same table is created on every MME in the pool given the IMSI of the UE. (c) Only allowed backup MMEs may be employed (e.g. P).

One example of such a mapping of IMSI to "hash value" meeting these requirements, would involve the steps of (a) starting with a ordered list of lists of MMEs using the same order of the lists of lists above, e.g. MME_1, MME_2, MME_3; (b) calculating k=hash value modulo (list length (N). Then, the k'th MME in the list is taken as the "candidate primary backup" MME for that hash value. This gives the result that any IMSI with the same hash value will be mapped to a particular MME. It is understood, that when a subgroup of back-up MMEs only are adapted to hold duplicate contexts, the MME in question are such back-up MMEs and also different from the MME where the UE is registered.

In FIG. 5b, further aspects of a method for the SGW provides that, in case of a failing MME or a communication fault relating to an MME, respective duplicate UE contexts may be re-installed for unavailable UE contexts.

In step 510, the SGW receives a downlink packet for a user entity. The SGW buffers the downlink packet to the UE.

Figure 7:
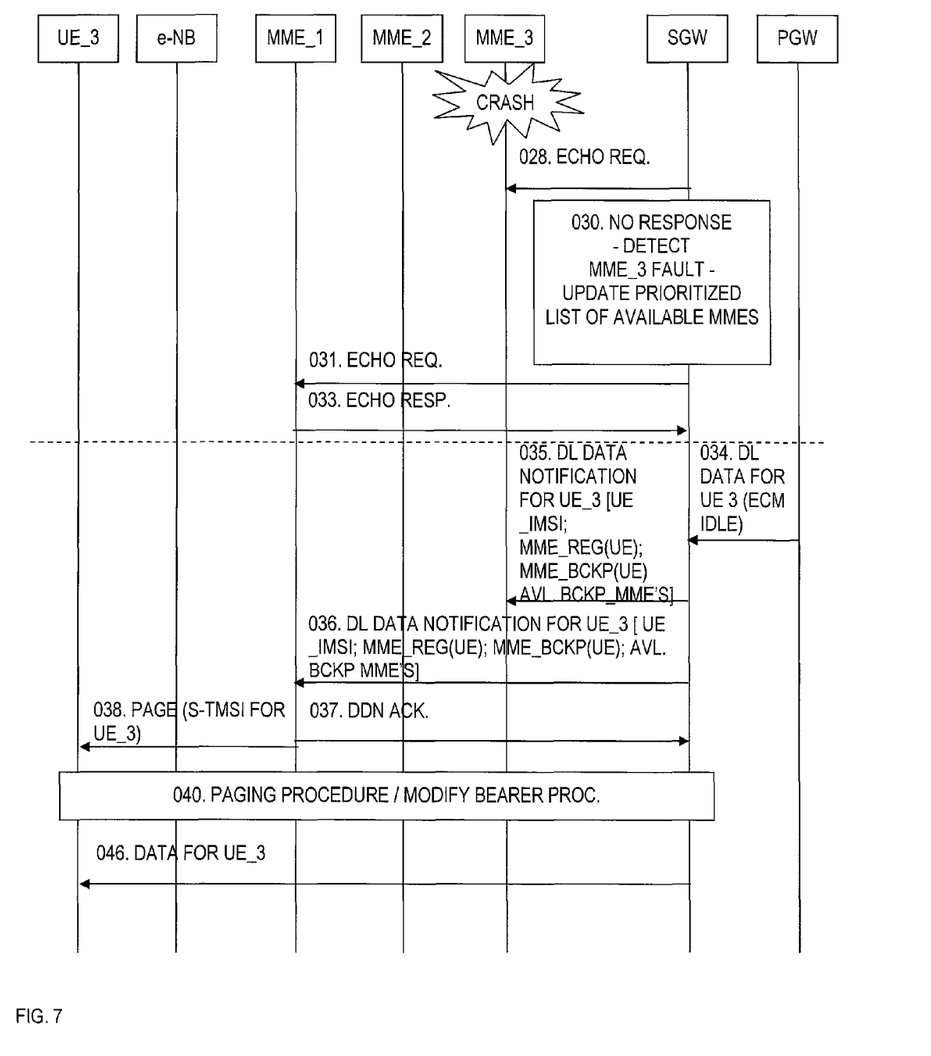
FIG. 7 shows a further signalling diagram according to the first embodiment of the invention.

In step 513, the SGW transmits a message or information, such as a downlink data notification message 036, c.f. FIG. 7, to the prioritized available MME, be it the registered MME or the back-up MME in case the registered MME is not available, according to the list 2 held in the SGW, the sent information advantageously comprising information concerning the IMSI, the registered MME, and the back-up MME.

Subsequently, the SGW await an acknowledgement, such as a DDN acknowledgement/response, step 514. If received, the SGW await a modify bearer request and subsequently transmits buffered data to the UE via eNB, step 520. If no, in step 514, the method proceeds to step 516, here it is investigated whether the prioritized list 2 is exhausted for the given UE. If not the method proceeds to step 513 for attempting with the next MME, designated as available, on the list. If yes, step 518, information is transmitted to any MME in the pool comprising the information mentioned under step 513.

Figure 5C:
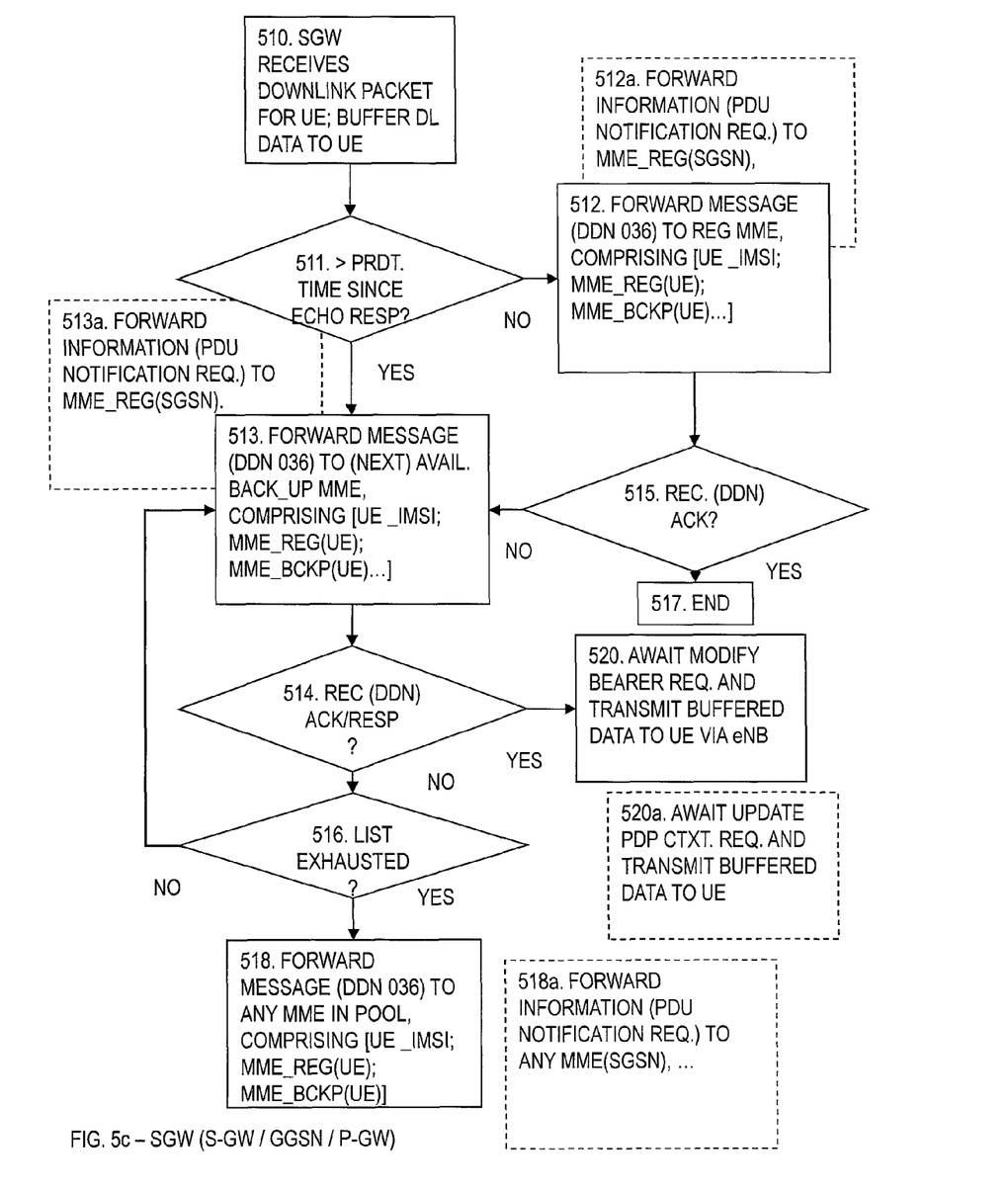
FIG. 5c shows a still further flow diagram for an SGW pertaining to the second embodiment of the invention.

FIG. 5c. is a further embodiment, in which additional steps over FIG. 5b are provided. Initially the steps marked by dashed lines will be left out from the explanation.

After step 510, receiving a DL packet, in step 511, it is investigated whether a predetermined time limit has expired since an echo request was transmitted from the SGW and successfully responded by the MME. If no, the SGW judges that the MME may be only temporarily unavailable because an echo response could still be outstanding but not transmitted, and the above mentioned information, such as DDN 036, is transmitted to the registered MME, step 512. If so, the SGW awaits an acknowledge, 515, upon the reception of which, the method ends, 517. If an acknowledge is not received, from 515, the SGW transmits the mentioned information to the prioritized back-up MME in step 513, which would also occur had the predetermined time for receiving an echo response 511 expired.

The above, procedure is explained with regard to LTE. However, the invention may also be utilized for 2G and 3G in which the mobility management entity, MME, is constituted by a serving gateway support node, SGSN, which may be arranged in a pool. In the latter case, instead of 512, step 512a is carried out in which a PDU notification request is transmitted. Step 520a replaces 520. Step 520 awaits an Update PDP context request. Step 518a replaces 518 and involves forwarding information as e.g. payload or such as a PDU notification request. 513a replaces likewise 513.

Figure 6:
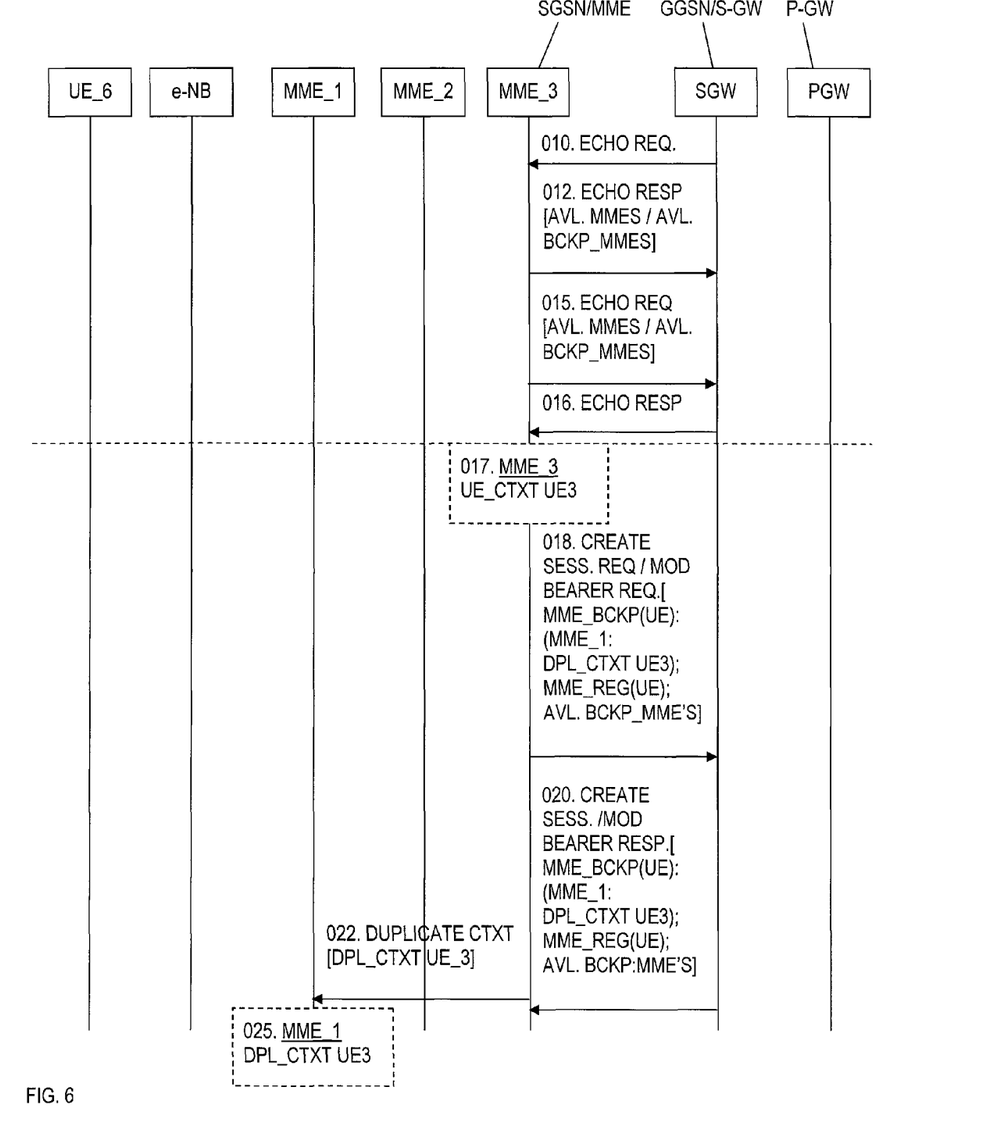
FIG. 6 shows a signalling diagram according to a first embodiment of the invention.

In FIGS. 6 and 7, a possible scenario according to the invention is illustrated. The dashed lines indicate that the partitions are performed asynchronously. It is assumed by the exemplary scenario that the UE is in idle state. This means the S-GW cannot send the downlink end-user data directly to the eNB.

In step 010, echo request is received by MME_3 and responded to 012 by SGW.

In step 015, echo request is transmitted by MME_3 and responded to 016 by SGW.

The MME informs about available MMEs and the back-up MMEs and the SGW may also inform about the number N of available MMEs/back-up MMEs and their associated order numbers or identification codes P.

In step 017 an exemplary UE_3 may be registered with MME_3 and the UE context, UE_CTXT_UE3 is stored with MME_3.

Accordingly, MME_3 appoints a back-up MME, with order number Q1, for the given UE according to steps 402 and 404 and informs the SGW of the appointed back-up MME— MME_BCKP(UE)—by means of create session request message 018, 406. The duplicate context, DPL_CTXT_UE3, may be forwarded to the SGW, in 018. Also included in the Create Session Request is provided the identity of the node(s) that stores the backup copy of the UE context. The SGW updates its internal list 2 in FIG. 3 of available members of the pool at a received message that includes an update. The SGW stores the identity of the backup-node as part of the SGW's representation of the UE. Moreover, the available back-up MMEs as known to the MME may be provided in message 018.

The SGW responds with a create session response message, optionally comprising the duplicate context, message 020. This message may contain all the information types as in message 018, either as identical data or updated information, or an indication about if SGW accepted the information in 018.

MME_3 moreover, transmits the duplicate context, DPL_CTXT_UE3, to the appointed back-up MME, which according to function F is found to be MME_1 for the given UE, UE_3, message 022, denoted duplicate context, according to step 408. Step 408 is performed asynchronous to the previous steps. Step 408 is performed when MME has changed any part of the UE context that is provided as a duplicate UE context.

Accordingly, in 025, the duplicate context for UE_3 is established in MME_1.

Should a failure occur, for instance in MME_3, the following events may occur according to the embodiments explained above as further illustrated in FIG. 7.

The SGW transmits echo request 028 but receives no echo response from MME_3.

Consequently, in step 030, step 410, the SGW deems the MME_3 is not available, and is ready to select an alternative MME holding a duplicate context, which according to the internal list in the SGW is MME_1.

The SGW periodically performs echo request and receives echo response from all MMEs, hence also from MME_1 in steps 031 and 033.

When receiving downlink data for UE_3, 034, the SGW is ready to select appointed MME_1, holding the duplicate context for UE_3, for transmitting the downlink data notification message 036 for UE_3 to back-up MME, according to step 513. Hence, new information items transferred from SGW to MME in DDN (IMSI) concern the identity of the backup MME and the identity of the MME where the UE was registered at the time of failure.

As seen above, at execution of the restore functionality, step 513, the SGW selects an available node in the pool based on the list of available nodes and with a preference of the most prioritized backup node, and sends a Downlink Data Notification including IMSI to that node. The Downlink Data Notification message comprises the identity of the backup node and the node where the UE was registered at time of failure.

As recalled from above, this is achieved by that the sending node executes the Echo procedure to all MMEs that act as a receiver of duplicated UE contexts. By knowing that the receiver is available it's not necessary for the receiver to send an acknowledge message for a received duplicate UE context.

As a side effect, the sending node is updated with status about each of the pool members. This information may be provided to the SGW as part of the GTPv2 messages Create Session Request, Echo Request, and Echo Response when any of the three is sent to the SGW.

Optionally, the SGW may attempt to address the registered MME if deeming the registered MME to be just temporarily unavailable, 035.

Subsequent, to DDN 036, the SGW awaits a DDN acknowledge 037. The MME_1 transmits a page with S-TMSI for UE_3.

Subsequently, known paging response/modify bearer processes 040 as known in the art may follow and data is delivered to UE_3 on the user plane, 046.

As part of the task of duplicating UE context to a different storage location, the sending SGSN/MME node ensures that there is a node that is prepared to receiving the user plane downlink data.

It is observed that, a SGW with standard support would cause additional load to the MME, in relation to the SGW according to the invention, since an MME that receives a Downlink Data Notification including IMSI has no information about where the backup copy of the UE context is stored.

According to the invention, even if MME back-up information is not available or is not established yet or has become outdated, c.f. step 414, the MME may perform an intelligent guess about where the backup is stored, c.f. step 418, based on executing IMSI hash and compensating for any node that this not operative.

It is seen that the methods according to the invention presents a signalling and memory efficient way of establishing duplicate context of UE contexts in MMEs.

Figure 8:
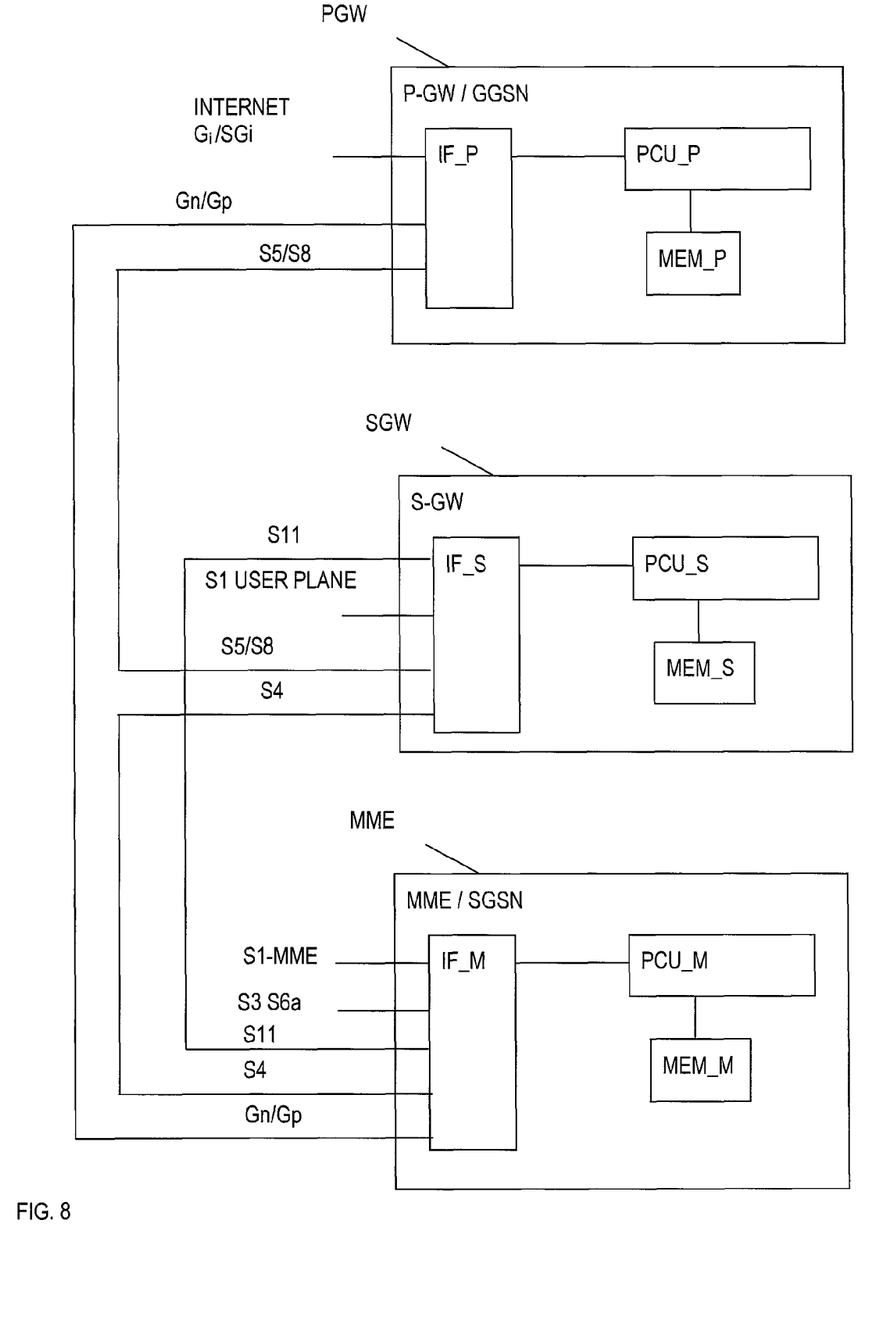
FIG. 8 shows embodiments a serving gateway and a mobility management entity according to the invention adapted for carrying out the methods shown in FIGS. 3-7; a packet gateway is also shown.

FIG. 8 shows an embodiment of a PGW (P-GW/GGSN), a SGW (S-GW) and an MME (MME/SGSN) according to the invention.

The P-GW comprises a central processing unit, PCU_P, a memory MEM_P and an interface unit IF_P comprising at least interfaces to the Internet $G_i$/SGi, a Gn/Gp interface and a S5/S8 interface. The PGW may comprise functionality as is known in the art.

There is moreover provided a SGW according to the invention comprising a central processing unit, PCU_S, a memory MEM_S and an interface unit IF_S comprising at least an S11 interface, a S1 user plane interface and a S5/S8 interface, as well as a S4 interface. The second method of the SGW may run on the central processor unit, PCU_S. The SGW may, in addition to the functionality explained in this document, comprise SGW functionality as is known in the art.

There is moreover provided an MME according to the invention comprising a central processing unit, PCU_M, a memory MEM_M and an interface unit IF_M comprising at least an S1-CP interface, a Gn/Gp interface, an S3 interface and an S6a and S11 interface, as well as an S4 interface. The first method of the MME may run on the central processor unit, PCU_S. The MME may also comprise MME functionality as is known in the art, in addition to the functionality explained in this document In conclusion, there is provided a method for a mobility management entity, MME, MME_1, in a pool of MMEs. The MME being adapted for communicating with a serving gateway, SGW. The MME managing the mobility of user entities, UE, for establishing packet data communication between the serving gateway and user entities, UEs, via at least a base station. The method may comprises the steps of: establishing, 400, a UE context for a user entity; appointing, 404, a back-up MME for holding a duplicate context of the user entity; informing, 406, the SGW in which MME a duplicate context is held, or is to be held; and transmitting, 408, a duplicate context to the appointed MME.

The method for the MME may continuously effectuate that the MME is: receiving, 410, 412, information concerning the availability of other MMEs in the pool; and transmitting, 410, 412, information concerning the availability of other MMEs in the pool.

The method may further comprise establishing, 414, available MMEs in the pool.

The step of appointing, 404, may be performed, 402, by uniquely identifying a back-up MME according to a predetermined function, F and/or G, wherein the same manner of appointing being provided in at least a subgroup, MME_B-CKP, of the MMEs of the pool, such that any MME in the subgroup of the pool would appoint the same MME as a back-up MME for a given UE, the appointment moreover securing that an MME different from the registered MME is identified.

Moreover, the step of appointing, 404, further may be based, 402, on a subscriber identity value of the UE and the number, N, of the subgroup of MMEs in the pool and wherein a hash value is formed from the subscriber identity value.

The subgroup of the poll of MMEs may constitute MMEs, MME_BCKPs, adapted for holding duplicate contexts.

The method for the MME according to the invention may further comprise the step of transmitting, 406, a send bearer request/modify bearer request, 018, to the SGW for informing about MMEs of the sub-group.

According to another aspect there is provided a method for a serving gateway node, SGW, being adapted for communicating with a mobility management entity, MME, in a pool of MMEs, wherein an MME, MME_REG(UE), of at least a sub-group of the pool being adapted for storing at least a user entity context, 3, for which a corresponding user entity is registered; the MME, MME_BCKP(UE), of at least a sub-group, MME_BCKP, of the pool moreover being adapted for storing, 3, at least a duplicate user entity context, DPL_CTX-T_UE1, 3, for which a further corresponding user entity, UE_1, is not registered with the MME but which further user entity is registered in another MME of the pool. The SGW is being adapted for storing a list, 2, of user entities, indicating for a given user entity, in which MME, the corresponding user entity context, UE_CTXT, in question is registered and in which MME, a duplicate user entity context, DPL_CTXT, is held. The method may comprises the steps of: continuously updating, 502; 504, at least available MMEs and keeping a prioritized list, 2, 508, for the available MMEs; and upon receiving, 510, a downlink packet for a UE, forwarding, 513, a message or information, DDN 036, to a next available MME according to the prioritized list, 2, such as an MME at which the UE is registered or an MME, in which a duplicate context is held.

The forwarded message or information, 513, comprises at least a subscriber identity value of the UE, e.g. the IMSI (International Mobile Subscriber Identity), the MME where the UE is registered, MME_REG(UE), and at least one MME, MME_BCKP(UE), where a duplicate context is known to be held.

The method for the MME, may moreover comprise—checking, 516, if the list is exhausted and if so—forwarding, 518, the message of the information to any MME in the pool.

Further it may comprise—checking, 516, whether a predefined time has not yet expired since issuing an echo signal, 028, to the MME, and if so judging the MME where the UE is registered as being temporarily unavailable, and—forwarding, 513, the information or signal, DDN 036, to the registered MME, MME_REG(UE).

According to a still further aspect of the invention there is provided a mobility management entity, MME in a pool of MMEs the MME comprising a central processing unit, PCU_M, a memory, MEM_M, and an interface unit, IF_M. The MME is being adapted for communicating with at least one other MME, in the pool of MMEs, and the MME is moreover being adapted for communicating with a serving gateway, SGW, the MME is managing the mobility of user entities, UE, for establishing packet data communication between the serving gateway and user entities, UE's, via at least a base station, eNB. The MME is also being adapted for storing at least a user entity context, 3, for which a corresponding user entity is registered.

Moreover, the MME is being adapted for storing, 3, at least a duplicate user entity context for which a further corresponding user entity is not registered with the MME, but which further user entity is registered in the other MME of the pool.

Mobility management entity may be further adapted to: establishing, 400, a UE context for a user entity; appointing, 404, a back-up MME for holding a duplicate context of the user entity; informing, 406, the SGW in which MME a duplicate context is held, or is to be held; and transmitting, 408, a duplicate context to the appointed MME.

The mobility management entity may be further adapted to: Receiving—from or to a given MME—410, 412, information concerning the availability of other MMEs in the pool; from or to a given MME; transmitting—from or to a given MME, 410, 412, information concerning the availability of other MMEs in the pool. It may be further adapted for, establishing, 414, available MMEs in the pool.

The appointing, 404, may be performed by uniquely identifying a back-up MME according to a predetermined function, F and/or G, wherein the same manner of appointing being provided in at least a subgroup, MME_BCKP, of the MMEs of the pool, such that any MME in the subgroup of the pool would appoint the same MME as a back-up MME for a given UE, the appointment moreover securing that an MME different from the registered MME is identified.

According to the invention, the appointment, 404, may further be based, 402, on a subscriber identity value of the UE and the number, N, of the subgroup of MMEs in the pool and wherein a hash value is formed from the subscriber identity value.

The mobility management entity according to another aspect is further adapted for, transmitting, 406, a send bearer request/modify bearer request, 018, to the SGW for informing about MMEs of the sub-group.

According to a still further aspect of the invention there is provided a serving gateway node according to claim 23 wherein an MME, MME_REG(UE), of at least a sub-group of the pool is being adapted for storing at least a user entity context, UE_CTXT_UE2, 3, for which a corresponding user entity, UE_2, is registered. The MME, MME_BCKP(UE), of at least a sub-group, MME_BCKP, of the pool is moreover being adapted for storing, 3, at least a duplicate user entity context, DPL_CTXT_UE1, 3, for which a further corresponding user entity, UE_1, is not registered with the MME, MME_1, but which further user entity is registered in another MME, MME_2, of the pool. The SGW is being adapted for storing a list, 2, of user entities, indicating for a given user entity, in which MME, the corresponding user entity context, UE_CTXT, in question is registered and in which MME, a duplicate user entity context, DPL_CTXT, is held; the SGW being adapted for:—continuously updating, 502; 504, at least available MMEs and keeping a prioritized list, 2, 508, of available MMEs; and—upon receiving, 510, a downlink packet for a UE, the SGW further being adapted for forwarding, 513, a message or information, DDN 036, to a next available MME according to the prioritized list, 2, such as an MME at which the UE is registered or an MME, in which a duplicate context is held.

The forwarded message or information, 513, may comprise at least a subscriber identity value of the UE; the MME where the UE is registered, MME_REG(UE), and at least one MME, MME_BCKP(UE), where a duplicate context is known to be held.

The SGW is moreover being adapted for: checking, 516, if the list is exhausted and if so forwarding, 518, the message of the information to any MME in the pool.

The SGW moreover being adapted for: Checking, 516, whether a predefined time has not yet expired since issuing an echo signal, 028, to the MME, and if so judging the MME where the UE is registered as being temporarily unavailable, and forwarding, 513, the information or signal, DDN 036, to the registered MME, MME_REG(UE).

AN MME holding at least one duplicate context for a given user entity is denoted back-up MME, MME_BCKP. In an embodiment, the list, 2, is updated, 012, 15, with information concerning back-up MMEs.

The MMEs in the pool may be LTE MMEs and the forwarded message or information to the MME is a downlink data notification signal, DDN.

The MMEs in the pool may further be Serving Gateway Support Nodes, SGSN, and the forwarded message or information, 512a; 518a, to the MME is a PDU Notification Request.

The invention claimed is:

1. A method in a network in which a mobility management entity (MME) in a pool of MMEs is adapted for communicating with (i) at least one other MME in the pool of MMEs and (ii) a serving gateway (SGW), and is adapted for managing mobility of user entities (UEs) for establishing packet data communication between the SGW and UEs via at least a base station, the method comprising:
   establishing a UE context for a user entity (UE);
   appointing a back-up MME for holding a duplicate UE context of the user entity;
   informing the SGW of the back-up MME in which the duplicate context is held, or is to be held; and
   transmitting the duplicate UE context to the appointed back-up MME, wherein said appointing the back-up MME comprises using a predetermined function to select a MME as the back-up MME, wherein each MME in a subgroup of the MMEs in the pool uses said predetermined function to select a back-up MME such that any MME in the subgroup would appoint the same MME as a back-up MME for a given UE, the selected back-up MME being different than a registered MME for the given UE.

2. The method according to claim 1, further comprising:
   receiving information concerning availability of other MMEs in the pool; and
   transmitting information concerning the availability of other MMEs in the pool.

3. The method according to claim 2, further comprising the step of establishing available MMEs in the pool.

4. The method according to claim 1, wherein the step of appointing the MME as a back-up MME for holding the duplicate UE context is further based on a subscriber identity value of the corresponding UE and the number (N) of the subgroup of MMEs in the pool, and comprises forming a hash value from the subscriber identity value.

5. The method according to claim 4, wherein the subgroup comprises MMEs adapted for holding duplicate contexts.

6. The method according to claim 4, further comprising the step of transmitting a request to the SGW for information about MMEs of the sub-group.

7. The method according to claim 1, wherein the step of appointing comprises selecting a plurality of back-up MMEs for the registered MME.

8. A method performed by a serving gateway (SGW) node, the SGW node being adapted for communicating with a mobility management entity (MME) that is included in a pool of MMEs, wherein the SGW is in a network that includes:
   a first MME of at least one sub-group of the pool adapted for storing a first user entity context of a first user entity registered with the first MME,
   a second MME of the at least one sub-group of the pool adapted for storing at least a duplicate user entity context of the first user entity, and wherein the first MME is not a registered MME for a further corresponding user entity, the further corresponding user entity being registered with another MME of the pool,
   the method comprising:
   the SGW storing a list of user entities, the list indicating, for a given user entity, the MME with which the corresponding user entity context is registered and the MME with which the duplicate user entity context of the given user entity is held,
   the SGW continuously updating available MMEs and keeping a prioritized list of the available MMEs; and
   upon receiving a downlink packet for a given UE, the SGW forwarding a message to a next available MME according to the prioritized list, the list identifying one MME at which the UE is registered or another MME in which the duplicate UE context of the given UE is held.

9. The method according to claim 8, wherein the message comprises: a subscriber identity value of the UE, information identifying the MME in which the UE is registered, and information identifying an MME that is known to hold the duplicate context.

10. The method according to claim 9, wherein the MME holding the duplicate context for the given user entity is a back-up MME, and wherein the prioritized list of available MMEs is updated with information concerning back-up MMEs.

11. The method according to claim 8, further comprising checking if the prioritized list of available MMEs is exhausted, and, if so, forwarding the message to any MME in the pool.

12. The method according to claim 8, further comprising:
   checking whether a predefined time has not yet expired since issuing an echo signal to the MME with which the UE is registered, and, if so, declaring the MME in which the UE is registered as being temporarily unavailable.

13. The method according to claim 8, wherein the MMEs in the pool are LTE MMEs and the forwarded message to the MME is a downlink data notification signal (DDN).

14. The method according to claim 8, wherein the MMEs in the pool are Serving Gateway Support Nodes (SGSN) and the forwarded message is a PDU Notification Request.

15. A mobility management entity (MME), comprising:
   a central processing unit;
   a memory; and
   an interface unit, wherein
   the MME is included in a pool of MMEs that includes a second MME and a third MME,
   the MME is adapted for:
   communicating with at least one other MME in the pool of MMEs,
   communicating with a serving gateway (SGW),
   managing mobility of user entities (UEs) for establishing packet data communication between the SGW and UEs via at least a base station,
   storing a first user entity context corresponding to a first user entity registered with the MME, and
   a duplicate user entity context corresponding to a second user entity that is not registered with the MME, and wherein the second user entity is registered with another MME included in the pool.

16. The MME according to claim 15, wherein the MME is further adapted for:
   establishing a UE context for a user entity;
   selecting a MME as a back-up MME for holding a duplicate context of the user entity;
   informing the SGW of the MME in which the duplicate context is held, or is to be held; and
   transmitting the duplicate context to the selected MME.

17. The MME according to claim 16, wherein the MME is further adapted for, receiving from another MME information concerning the availability of other MMEs in the pool.

18. The MME according to claim 17, being further adapted for establishing available MMEs in the pool.

19. The MME according to claim 16, wherein
   the MME is further adapted for performing the selecting step by using a predetermined function to select the back-up MME,
   wherein each MME in a subgroup of the MMEs in the pool uses said predetermined function to select a MME as the back-up MME such that any MME in the subgroup would appoint the same MME as a back-up MME for a given UE,
   the selected back-up MME being different than a registered MME for the given UE.

20. The MME according to claim 19, wherein
   the selecting the back-up MME for holding the duplicate UE context is further based on a subscriber identity value of the corresponding UE and the number (N) of the subgroup of MMEs in the pool, and comprises forming a hash value from the subscriber identity value.

21. The MME according to claim 19, wherein the subgroup comprises MMEs adapted for holding duplicate contexts.

22. The MME according to claim 19, being further adapted for transmitting a bearer request to the SGW for information about MMEs of the sub-group.

23. A serving gateway node (SGW), comprising:
   a central processing unit;
   a memory; and
   an interface unit, wherein
   the SGW is adapted for communicating with a mobility management entity (MME) that is included in a pool of MMEs,
   the SGW is further adapted for:
   storing a list of user entities, the list indicating, for a given user entity in the list, (i) a first MME in which a corresponding user entity context is registered and (ii) a second MME that stores a duplicate user entity context for the given UE.

24. The SGW according to claim 23, wherein the SGW is further adapted for:
   upon receiving a downlink packet for the given UE, forwarding a message to a next available MME according to a prioritized list of available MMEs, wherein the next available MME is an MME at which the given UE is registered or an MME that holds the duplicate context of the given UE.

25. The SGW according to claim 24, wherein the forwarded message comprises: a subscriber identity value of the given UE, the MME at which the given UE is registered, and the MME where the duplicate context of the given UE is known to be held.

26. The SGW according to claim 24, wherein the list is updated with information concerning back-up MMEs.

27. The SGW according to claim 24, wherein the SGW is further adapted for checking if the list is exhausted, and, if so, forwarding the message to any MME in the pool.

28. The SGW according to claim 24, wherein the SGW is further adapted for
 checking whether a predefined time has not yet expired since issuing an echo signal to the MME in which the UE is registered, and if so judging the MME in which the UE is registered as being temporarily unavailable.

29. The SGW according to claim 24, wherein the MMEs in the pool are LTE MMEs and the forwarded message is a downlink data notification signal.

30. The SGW according to claim 24, wherein the MMEs in the pool are Serving Gateway Support Nodes (SGSN) and the forwarded message is a PDU Notification Request.

* * * * *

UNITED STATES PATENT AND TRADEMARK OFFICE
CERTIFICATE OF CORRECTION

| | | |
|---|---|---|
| PATENT NO. | : 8,908,603 B2 | Page 1 of 1 |
| APPLICATION NO. | : 13/486303 | |
| DATED | : December 9, 2014 | |
| INVENTOR(S) | : Olsson et al. | |

It is certified that error appears in the above-identified patent and that said Letters Patent is hereby corrected as shown below:

In the Specification

In Column 3, Line 39, delete "SGW," and insert -- SGW. --, therefor.

In Column 7, Line 29, delete "FIG.5c." and insert -- FIG.5c --, therefor.

In the Claims

In Column 14, Line 6, in Claim 15, delete "a duplicate" and insert -- storing a duplicate --, therefor.

In Column 14, Line 21, in Claim 18, delete "being further" and insert -- further being --, therefor.

Signed and Sealed this
Fourteenth Day of July, 2015

Michelle K. Lee
*Director of the United States Patent and Trademark Office*